United States Patent [19]
Dobler et al.

[11] Patent Number: 6,008,547
[45] Date of Patent: Dec. 28, 1999

[54] ARRANGEMENT FOR CONTACTLESS TRANSMISSION OF SIGNALS BETWEEN VEHICLE PARTS MOVABLE LINEARLY WITH RESPECT TO ONE ANOTHER

[75] Inventors: Klaus Dobler, Gerlingen; Erich Zabler, Stutensee; Anton Dukart, Wörth; Thomas Herrmann, Langenbrettach, all of Germany

[73] Assignee: Robert Bosch GmbH, Stuttgart, Germany

[21] Appl. No.: 09/077,057
[22] PCT Filed: Jul. 24, 1996
[86] PCT No.: PCT/DE96/01361
§ 371 Date: May 18, 1998
§ 102(e) Date: May 18, 1998
[87] PCT Pub. No.: WO97/20710
PCT Pub. Date: Jun. 12, 1997

[30] Foreign Application Priority Data
Dec. 5, 1995 [DE] Germany .......................... 195 45 220

[51] Int. Cl.⁶ ................. B60L 1/00; H01F 21/06
[52] U.S. Cl. ............................... 307/10.1; 336/119
[58] Field of Search ................... 307/10.1, 104; 336/119, 129

[56] References Cited

U.S. PATENT DOCUMENTS

| | | | |
|---|---|---|---|
| 4,612,527 | 9/1986 | Third et al. | 336/19 |
| 5,696,409 | 12/1997 | Handman et al. | 307/10.1 |
| 5,831,841 | 11/1998 | Nishino | 307/10.1 |

Primary Examiner—Jeffrey Gaffin
Assistant Examiner—Rios Roberto
Attorney, Agent, or Firm—Kenyon & Kenyon

[57] ABSTRACT

An arrangement for contactless transmission of signals, e.g., between at least one circuit unit installed on the vehicle body and at least one circuit unit in a vehicle seat mounted displaceably on rails is described. This arrangement is free of wear and guarantees interference-free signal transmission. This arrangement consists of at least one repeating coil whose primary winding and secondary winding are in separate pot-type cores, one of which is mounted on a stationary vehicle part (body) and the other is mounted on the movable vehicle part (vehicle seat). Both pot-type cores are designed as rails sliding along one another and having sections such that together they form a closed circuit for the magnetic flux between the primary winding and the secondary winding.

11 Claims, 5 Drawing Sheets

ARRANGEMENT FOR CONTACTLESS TRANSMISSION OF SIGNALS BETWEEN VEHICLE PARTS MOVABLE LINEARLY WITH RESPECT TO ONE ANOTHER

FIELD OF THE INVENTION

The present invention relates to an arrangement for contactless transmission of signals between a stationary vehicle part and a vehicle part that moves linearly with respect thereto, and—preferably between at least one circuit unit installed on a vehicle body and at least one circuit unit in a vehicle seat displaceably mounted on rails.

BACKGROUND INFORMATION

Various electrical devices are often installed in vehicle seats, such as the driver's seat or the passenger seat, e.g., for heating or adjustment of the seat. The seat may also have electronic circuits for detection of seat occupancy in conjunction with airbag systems. Passenger seats have recently also been equipped with side bags in the armrest of the seat. For all these devices, control or power signals must be transmitted from central circuit units permanently installed on the vehicle body. Therefore, it is advantageous to provide an arrangement that is wear-resistant and transmits with a high reliability signals between a stationary vehicle part and a vehicle part (e.g., a vehicle seat) that moves linearly with respect thereto.

SUMMARY OF THE INVENTION

This object is achieved by providing a repeating coil whose primary and secondary windings are in separate pot-type cores, one of which is mounted on the stationary vehicle part and the other on the movable vehicle part. Both pot cores are designed as rails that slide along one another and have sections so that together they form a closed circuit for the magnetic flux between the primary and secondary windings.

The pot core rails may be designed either as H-sections, L-sections, T-sections or E-sections. These section shapes ensure that assembly tolerances or tolerances in the relative movement of the pot core rails forming the repeating coil have hardly any disturbing effect on signal transmission. Moreover, a plurality of such rail-type repeating coils may also be installed on one vehicle seat when the seat has multiple electrical devices. These repeating coils may be advantageously integrated into the slide rails for the seat.

BRIEF DESCRIPTION OF THE DRAWINGS

FIG. 1b shows a perspective view of the pot cores illustrated in FIG. 1a.

FIG. 2b shows a perspective view of the pot cores illustrated in FIG. 2a.

FIG. 3b shows a perspective view of the pot cores illustrated in FIG. 3a.

FIG. 4b shows a perspective view of the pot cores illustrated in FIG. 4a.

DETAILED DESCRIPTION OF THE INVENTION

The repeating coil described below has two pot cores designed as rails, in which the primary and secondary windings are accommodated. These pot core rails, one of which is mounted on a stationary vehicle part (e.g., the body) and the other is mounted on a linearly movable vehicle part, slide along one another without coming in contact, while the movable vehicle part undergoes a linear displacement. There is almost no change in the distance (i.e., the air gap) between the two pot core rails during this displacement, so that the inductive coupling between the primary winding and the secondary winding remains constant. Therefore, displacement of the movable vehicle part does not have an interfering effect on the signals transmitted. FIGS. 1 through 4 show exemplary suitable sections for the pot core rails which form a closed circuit for the magnetic flux between the primary and secondary windings.

Figure 1A:
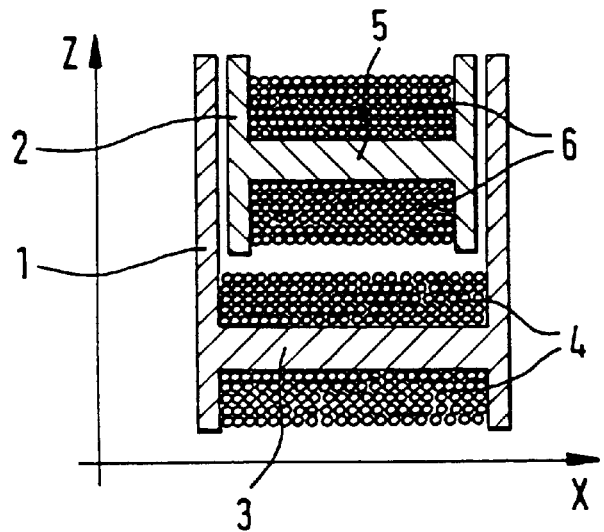
FIG. 1a shows a cross section through a repeating coil with H-section pot cores.
Figure 1B:
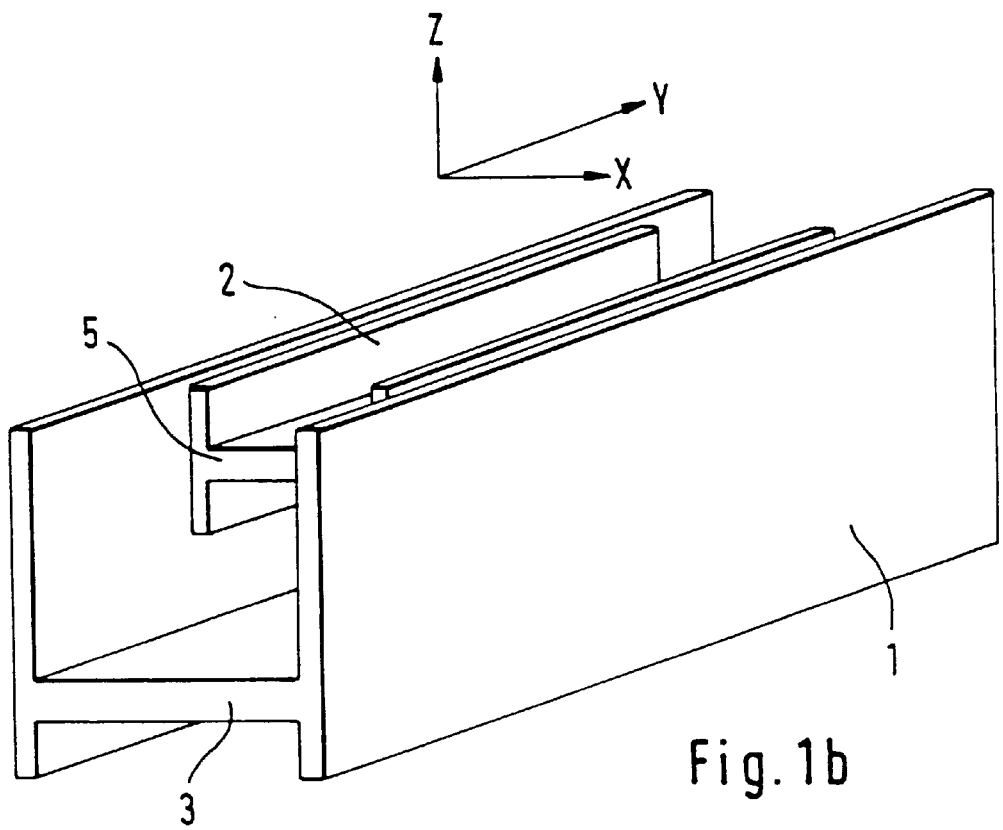

FIG. 1a shows a cross section through a repeating coil whose pot core rails 1 and 2 have H sections. As shown in FIG. 1b, one H-section rail 2 is guided inside the other H-section rail 1. For example, the primary winding 4 is wound on cross leg 3 of the larger H-section rail 1, and secondary winding 6 is wound on cross leg 5 of the smaller H-section rail 2. The smaller H-section rail 2 is thus inserted into the larger H-section rail 1, so that cross legs 3 and 5 of the two H-section rails 1 and 2 run parallel to one another. With this arrangement of the two H-section rails 1 and 2, a closed circuit is formed for generating the magnetic flux through the two windings 4 and 6. The H-section shape has the effect that pot cores 1 and 2 have large adjacent surfaces to the air gaps between two pot cores. Therefore, the magnetic resistance of the repeating coil is maintained very small, which results in a very good inductive coupling between the primary and secondary windings 4, 6. Positional tolerances between the two pot cores in the direction (X, Z) across the direction (Y) of displacement therefore have very little effect on the inductive coupling. One of the two pot core rails—pot core rail 1 in the embodiment illustrated in FIGS. 1a and 1b—is longer than the other pot core rail 2 in the direction of displacement (Y) by an amount such that there is still complete mutual coverage of the two pot cores even at a maximum displacement position.

Figure 1C:
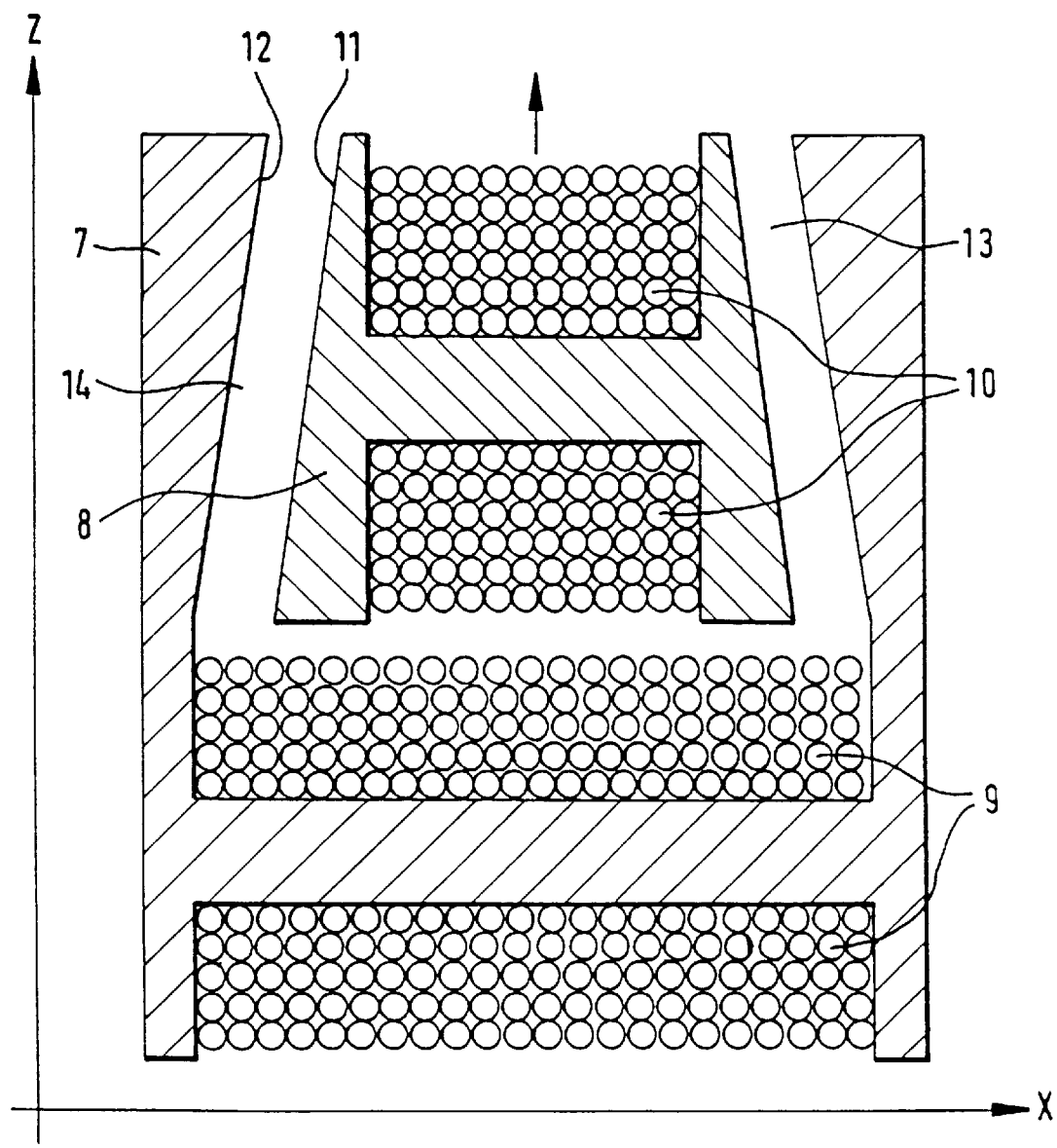
FIG. 1c shows a repeating coil including conically shaped H-section pot cores.

FIG. 1c shows another embodiment according to the present invention illustrating two pot core rails 7 and 8 acting as carriers for primary winding 9 and secondary winding 10. In this embodiment, small H-section rail 8 has rail conical outside contour 11 and large H-section rail 7 has a conical inside contour 12. This conical shaping of the two H-section rails 7 and 8 results in two air gaps 13 and 14 which do not run parallel to one another as in the embodiment shown in FIGS. 1a and 1b, but instead are inclined toward one another. The inclination of the two air gaps 13 and 14 is selected so that air gaps 13 and 14 become narrower as the two pot cores 7 and 8 move apart (in the direction of the arrow). This reduces the magnetic resistance in the air gaps 13, 14, so the reduction in magnetic coupling of the two windings 9 and 10 is compensated by the increasing movement apart of the two pot cores 7 and 8. Thus the transmission characteristic would not be affected even with an offset of the two pot cores 7 and 8 in the Z direction.

Figure 2A:
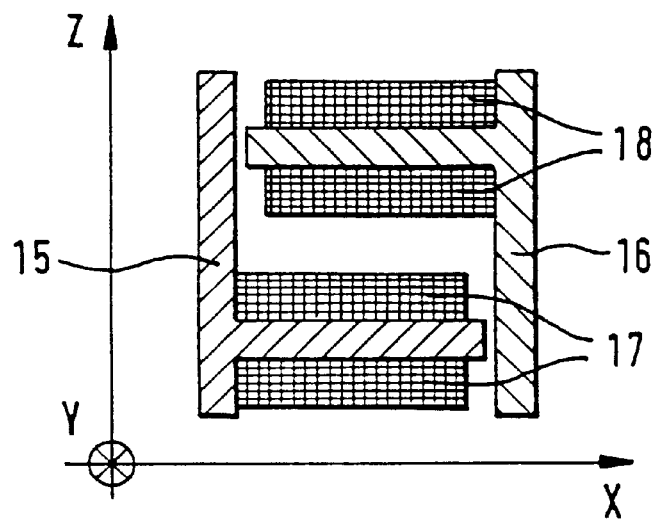
FIG. 2a shows a cross section through a repealing coil having L-section pot cores.
Figure 2B:
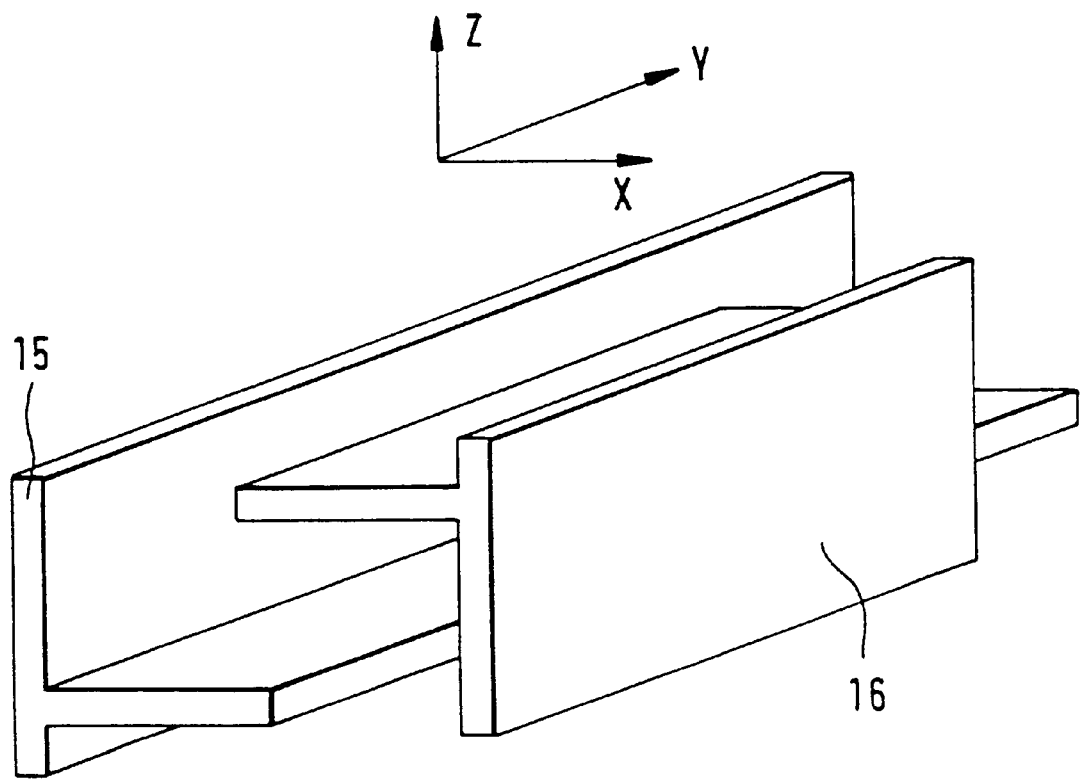

FIG. 2a shows yet another embodiment according to the present invention illustrating a cross section through two pot core rails 15 and 16 having an L section, and FIG. 2b shows a perspective view of the embodiment illustrated in FIG. 2a. These two L-section rails 15 and 16 are arranged relative to one another to form a closed circuit for the magnetic flux between primary winding 17 and secondary winding 18. Primary winding 17 is wound on a leg of L-section rail 15, and secondary winding 18 is wound on a leg of L-section rail 16.

Figure 3A:
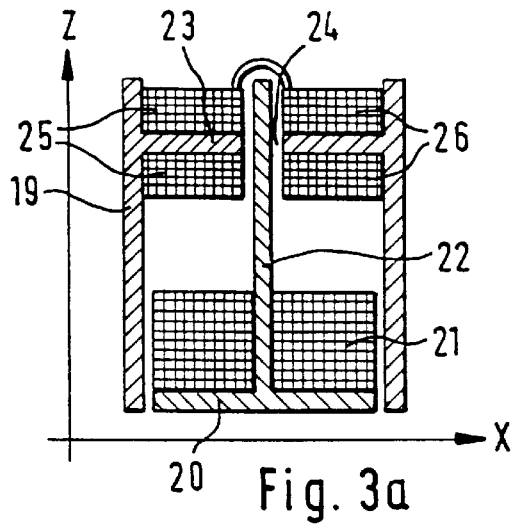
FIG. 3a shows a cross section through a repeating coil having a T-section pot core and a divided H pot core.

FIG. 3a shows a cross section through a repeating coil, where, of its two pot core rails 19 and 20, one pot core rail 19 has an H section, and the other pot core rail 20 has a T section. T-section rail 20 is inserted into H-section rail 19 with its longitudinal leg 22 carrying primary winding 21. Longitudinal leg 22 of T-section rail 20 then passes through a notch 24 cut in cross leg 23 of H-section rail 19 so that longitudinal leg 22 extends in displacement direction Y. This arrangement of the two pot core rails 19 and 20 is illustrated as a perspective view in FIG. 3b. The secondary winding of the repeating coil is wound onto cross leg 23 of H-section rail 19, where cross leg 23 is perpendicular to longitudinal Leg 22 of T-section rail 20. Because of notch 24 in cross leg 23 of H-section rail 19, the secondary winding is divided into two electrically connected part windings 25 and 26; one part winding 25 is wound onto cross leg 23 at the left of notch 24, and the other part winding 26 is wound onto cross leg 23 at the right of notch 24. With the arrangement of pot core rails 19 and 20 shown in FIGS. 3a and 3b, longitudinal leg 22 of T-section rail 20 forms two air gaps with cross leg 23 of H-section rail 19. In the embodiment shown in FIG. 3c, there is only one air gap between longitudinal leg 22 of T-section rail 20 and cross leg 27 of H-section rail 19 because longitudinal leg 22 ends before continuous cross leg 27 (which is not provided with a notch). The secondary winding on cross leg 27 is divided into the two part windings 25 and 26.

Figure 3C:
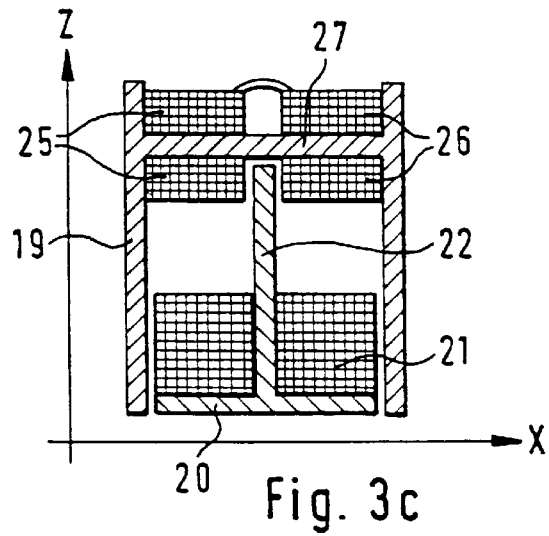
FIG. 3c shows a cross section through a repeating coil having a T-section pot core and an undivided H-section pot core.
Figure 3B:
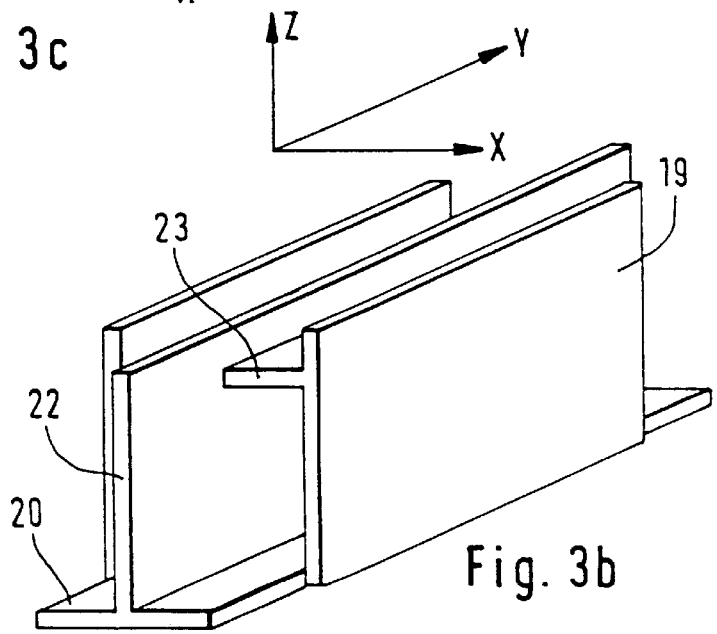

With both embodiments of the repeating coil shown in FIGS. 3a–3c, two symmetrical circuits are created for the magnetic flux between the primary and secondary windings. These embodiments have the advantage that their transmission characteristic is very insensitive to positional tolerances in X and Z directions.

Figure 4A:
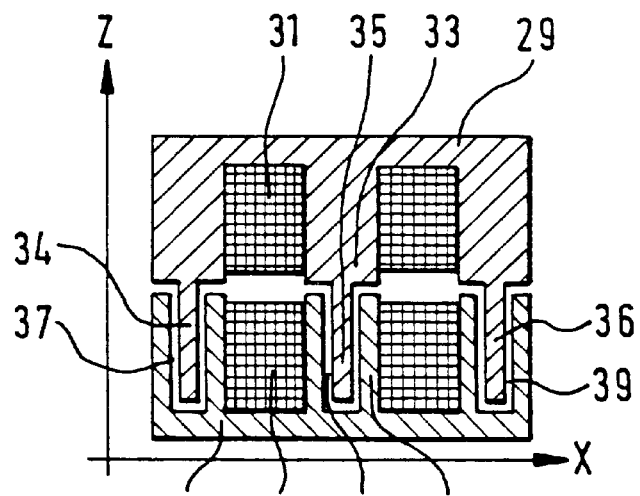
FIG. 4a shows a cross section through a repeating coil having E-section pot cores.
Figure 4B:
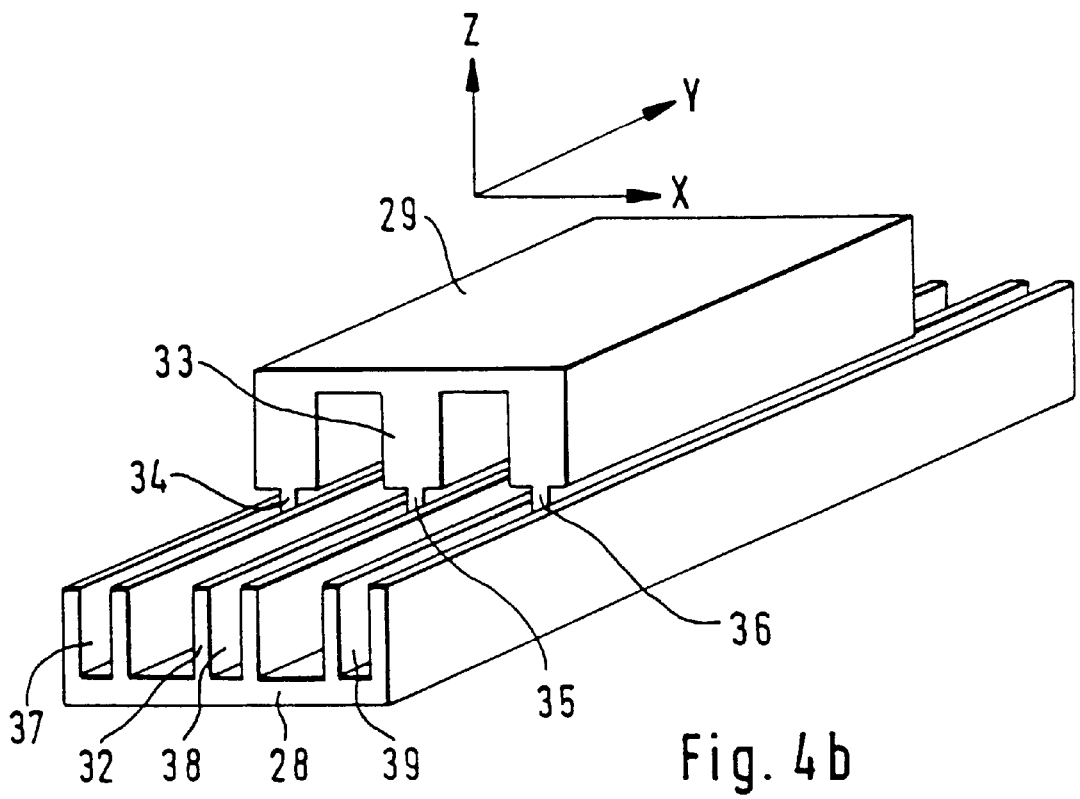

FIG. 4a shows a cross section through a repeating coil of a further embodiment according to the present invention whose two pot core rails 28 and 29 have an E section. The two E-section rails 28 and 29 face one another with the end faces of their cross legs, as also shown in FIG. 4b. Primary winding 30 and secondary winding 31 are each wound onto middle cross legs 32 and 33 of E-section rails 28 and 29. With this geometry of the pot cores, the primary and secondary windings are completely enclosed, thus leakage flux is greatly reduced. This contributes to an improvement in the inductive coupling of the two windings. A further embodiment in inductive coupling is provides that webs 34, 35 and 36, which run in the direction of displacement of the two rails, are integrally molded on the end faces of the cross legs of an E-section rail 29, and grooves 37, 38 and 39 are cut in the cross legs of the other E-section rail 28 so that webs 34, 35 and 36 of the opposing E-section rail 29 engage in grooves 37, 38, 39.

It is known that eddy currents develop if the pot cores of the repeating coil are composed of solid iron ($\mu r=300$). These eddy currents in the pot cores flow in the opposite direction from the field currents in the primary and secondary windings and thus have a negative effect on the coupling between the two windings. The development of eddy currents can be counteracted by providing the pot cores with several notches that extend in the X, Z planes and follow one another in the Y direction, for example. It is further advantageous if the notches are cut in the pot cores from the right and left sides in alternation. This arrangement increases the path for the eddy currents, i.e., the resistance for the eddy currents increases and causes a reduction in eddy current strength. The same effect can be achieved in a conventional manner by producing the pot cores by layering individual, mutually insulated sheets of metal. The eddy current can also be minimized by selecting a suitable material for the pot cores. This material must have a much lower electric conductivity than solid iron, but it should have approximately the same permeability $\mu r$ as solid iron. Plastic-bonded ultra-pure iron powder is a material that substantially meets these requirements. With a conductivity of 2200 S/m, this material is far below that of solid iron, which has a conductivity of 56 MS/m.

As described above, the pit cores have the geometry of rails, so they can be advantageously integrated in a space-saving manner into a slide rail of a vehicle seat. The rail-type repeating coil can also be installed at the side of a slide rail or at some other suitable location below the vehicle seat. If several electrical devices in the vehicle seat must be supplied with electric power or control signals that must not be allowed to influence one another mutually, several rail-type repeating coils should be provided.

What is claimed is:

1. An arrangement for contactlessly transmitting signals between a stationary vehicle part and a further vehicle part, the further vehicle part being linearly movable with respect to the stationary vehicle part, the arrangement comprising:
    at least one repeating coil including:
        a first pot-type core including a first pot-type rail and a first section;
        a second pot-type core including a second pot-type rail and a second section, one of the first pot-type core and the second pot-type core being mounted on the stationary vehicle part, and another one of the first pot-type core and the second pot-type core being mounted on the further vehicle part;
        a primary winding situated in one of the first pot-type core and the second pot-type core; and
        a secondary winding situated in another one of the first pot-type core and the second pot-type core,
    wherein one of the first pot-type rail and the second pot-type rail slides along another one of the first pot-type rail and the second pot-type rail, and
    wherein the first and second sections form a closed circuit to provide a magnetic flux between the primary winding and the secondary winding.

2. The arrangement according to claim 1,
    wherein the stationary vehicle part includes a vehicle body containing at least one first circuit unit, and
    wherein the further vehicle part includes a vehicle seat containing at least one second circuit unit and having rails, the at least one second circuit unit displaceably mounted on the rails.

3. The arrangement according to claim 1,
    wherein the first section includes a first H-section, and the second section includes a second H-section, a first H-section rail of one of the first pot-type rail and the second pot-type rail being inserted into a second H-section rail of one of the first pot-type rail and the second pot-type rail,
    wherein the primary winding is wound on a cross leg of one of the first pot-type rail and the second pot-type rail, and wherein the secondary winding is wound on another cross leg of another one of the first pot-type rail and the second pot-type rail.

4. The arrangement according to claim 3, wherein an outside contour of the first H-section rail and an inside contour of the second H-section rail have a conical shape, the first H-section rail and the second H-section rail forming a first air gap and a second air gap between the first and second H-section rails, one of first air gap and the second air gap inclining toward another one of the first air gap and the second air gap.

5. The arrangement according to claim 1, wherein the first section includes a first L-section, and the second section includes a second L-section, and wherein a first leg of the first L-section is aligned with a second leg of the second L-section to form the closed circuit for providing the magnetic flux.

6. The arrangement according to claim 1, wherein one of the first section and the second section includes an H-section, and another one of the first section and the second section includes a T-section, wherein a T-section rail of one of the first pot-type rail and the second pot-type rail is inserted into an H-section rail of one of the first pot-type rail and the second pot-type rail, and wherein a longitudinal leg of the T-section rail containing a first winding of the primary and secondary windings is orthogonally aligned with a cross leg of the H-section rail containing a second winding of the primary and secondary windings.

7. The arrangement according to claim 6, wherein the second winding includes two electrically connected part windings, and wherein the longitudinal leg of the T-section rail is situated between the two electrically connected part windings and forms a single air gap with the cross leg of the H-section rail.

8. The arrangement according to claim 6, wherein the second winding includes two electrically connected part windings, and wherein the longitudinal leg of the T-section rail is situated between the two electrically connected part windings and forms two air gaps with the cross leg of the H-section rail.

9. The arrangement according to claim 1, wherein the first section includes a first E-section, and the second section includes a second E-section, wherein the primary winding is wound around a first middle cross leg of one of the first pot-type rail and the second pot-type rail, and the secondary winding is wound around a second middle cross leg of another one of the first pot-type rail and the second pot-type rail, and wherein first end faces of a corresponding middle cross leg of the first pot-type rail face second end faces of another middle cross leg of the second pot-type rail.

10. The arrangement according to claim 9, wherein one of the first middle cross leg and the second middle cross leg has grooves carved in first corresponding faces of the first end faces and the second end faces, and wherein another one of the first middle cross leg and the second middle cross leg includes webs provided on second corresponding faces of the first end faces and the second end faces, the webs engaging the grooves.

11. The arrangement according to claim 1, wherein the at least one repeating coil is provided in a sliding rail of a vehicle seat.

* * * * *